No. 835,324. PATENTED NOV. 6, 1906.
R. H. RICE.
SHAFT BEARING.
APPLICATION FILED APR. 29, 1905.
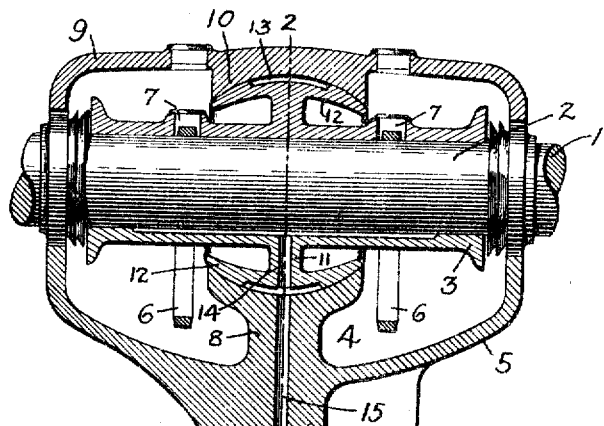
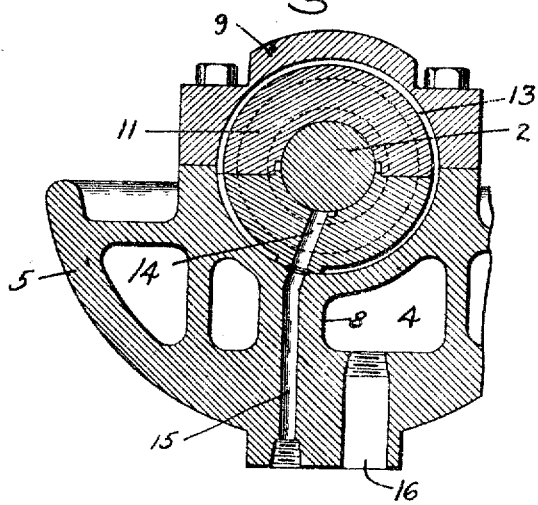
Witnesses:
Inventor
Richard H Rice

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

SHAFT-BEARING.

No. 835,324.

Specification of Letters Patent.

Patented Nov. 6, 1906.

Application filed April 29, 1905. Serial No. 258,046.

*To all whom it may concern:*

Be it known that I, RICHARD H. RICE, a citizen of the United States, residing at Lynn, county of Essex, State of Massachusetts, have invented certain new and useful Improvements in Shaft-Bearings, of which the following is a specification.

This invention relates to journal-bearings for shafts, and especially the shafts of steam-turbines, dynamo-electrical machinery, and other machines designed to be run at high speeds.

Such bearings generally comprise a tubular lining of bronze or the like made in two parts and extending the full length of the journal. The linings are of considerable thickness in order to have sufficient stiffness to afford a proper support for the shaft. Each lining is supported in a pillow-block, generally made of cast-iron, which has a seat fitted to receive a thickened or enlarged portion of the lining located preferably at about the middle thereof. Now when such a structure becomes heated by rapid running of the shaft or otherwise the bronze and the cast-iron expand unequally, and inasmuch as the coefficient of expansion of the bronze is greater than that of the cast-iron there results an increase of pressure or tightness at the joint between the lining and its seat in the pillow-block. Since the latter is heavier and stiffer than the lining, the latter cannot expand outwardly, and the result is that its internal bore becomes contracted or distorted. This effect is the more marked if the lining is a split one, and in either case it either actually grips the shaft or causes the effective wearing-surface to be altered in accordance with the distortion of the internal shape of the lining. It has been suggested that this difficulty can be obviated by providing the lining with flanges where it is supported in its seat in the pillow-block, so that said flanges can yield when the bearing gets hot, and thus allow the lining to expand without pinching the shaft. Mr. John G. Callan has suggested that these flanges be extended inwardly toward each other from ribs at the ends of the central thickened portion of the lining. This construction is satisfactory for linings having a cylindrical seat in the pillow-block; but when the seat is spherical it is found that there is difficulty in carrying the surface of contact between the lining and the pillow-block far enough down on the sides to properly locate the lining without either unduly attenuating the flanges or getting the radial compression which it is sought to avoid.

My invention therefore aims to overcome this trouble; and it consists in a spherical bearing of the class described in which the flanges project in opposite directions from a central rib concentric with the lining, the outer surface of the ball being cut away adjacent to the plane of said web in order to permit the necessary expansion there.

In the accompanying drawings, Figure 1 is a longitudinal section of a shaft-bearing embodying my invention; and Fig. 2 is a cross-section of the same on the line 2 2, Fig. 1.

The shaft 1 is shown as provided with a journal 2, received in a lining 3 of bronze or the like, which is inclosed in a chamber 4 in the pillow-block 5. The chamber forms an oil-well, and the journal may be lubricated by rings 6, hanging loosely on the journal and dipping into the oil, slots 7 being made in the lining to permit them to revolve freely.

The lining is supported at its middle in a spherical seat formed in a heavy web 8, integral with the pillow-block. The cap 9 of the block has a central boss 10 corresponding with this web and forming the upper half of the seat. The lining is made in two parts, the lower received in the seat in the web and the upper in the boss on the cap. At the middle of the lining is a circumferential rib 11, from the periphery of which project in opposite directions the flanges 12, whose outer surface is spherical to fit the spherical seat in the pillow-block. A wide shallow groove 13 is formed in the outer surface of the ball in the plane of the rib 11, so that along this portion of the ball it does not come in contact with its seat.

In the lower half of the lining is a passage 14, running radially through the rib 11 and communicating with a duct 15 in the pillow-block. Through this duct and passage cold oil is constantly fed to the bearing, the surplus being led off through a drain 16.

When this bearing becomes heated, the flanges yield inwardly, their outer edges being especially flexible by reason of their distance from the supporting-rib 11. The groove 13 permits sufficient radial expansion of the rib to avoid any compression at this part of the lining. Moreover, the cold oil which fills the duct, passage, and groove keeps down the temperature of these parts, so that no injurious expansion can take place here. Moreover, the rib itself conducts a certain amount of heat away from the body of the lining to the pillow-block.

It will be noticed that the seat in the pillow-block is quite wide, so that there is plenty of support for the ball, and the bearing of the ball in its seat is at such points as to give an excellent resistance to end thrust.

In addition to relieving the expansion by yielding when the bearing gets hot the flanges have also a slight elastic or spring action, which tends to deaden the shocks or vibration communicated from the shaft to the lining, and this assists in producing an easier-running bearing.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by equivalent means.

What I claim as new, and desire to secure by Letters Patent of the United States, is—

In a journal-bearing, the combination with a pillow-block having a spherical seat, of a lining having a circumferential rib provided with flanges extending in opposite directions therefrom and having spherical outer surfaces to fit said seat, and a shallow groove between said surfaces in line with said rib.

In witness whereof I have hereunto set my hand this 26th day of April, 1905.

RICHARD H. RICE.

Witnesses:
JOHN A. MCMANUS, Jr.,
ALEXANDER J. R. FIEGO.